United States Patent
Wang

(10) Patent No.: US 7,197,138 B2
(45) Date of Patent: Mar. 27, 2007

(54) PROGRAMMABLE DEVICE AND METHODS FOR DISABLING A RING SIGNAL IN RESPONSE TO A DETECTED OFF-HOOK CONDITION

(75) Inventor: Jian Wang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 317 days.

(21) Appl. No.: 10/116,728

(22) Filed: Apr. 3, 2002

(65) Prior Publication Data

US 2002/0154763 A1 Oct. 24, 2002

(30) Foreign Application Priority Data

Apr. 4, 2001 (CN) ............................... 01105853 A

(51) Int. Cl.
*H04M 3/22* (2006.01)

(52) U.S. Cl. .................................. 379/399.01; 379/382

(58) Field of Classification Search ................ 379/377, 379/382, 413.01, 399.01, 399.02
See application file for complete search history.

(56) References Cited

U.S. PATENT DOCUMENTS 6,570,984 B1 * 5/2003 Shalev ....................... 379/382

6,735,302 B1 * 5/2004 Caine et al. ................ 379/405

OTHER PUBLICATIONS

80C186EC/80C188EC Microprocessor User's Manual; Intel Corporation; 1995; pp. 13-1 through 13-12.*

* cited by examiner

*Primary Examiner*—Sinh Tran
*Assistant Examiner*—Walter F Briney, III
(74) *Attorney, Agent, or Firm*—Bever, Hoffman & Harms

(57) ABSTRACT

A method and structure for cutting a ring current when a telephone enters an off-hook state. The method includes: (1) activating an off-hook detected signal when the telephone enters an off-hook state, (2) applying the off-hook detected signal to a selected input terminal of a coder/decoder (CODEC), (3) storing configuration information in the CODEC identifying the selected input terminal and a selected output terminal of the CODEC, (4) activating a ring cut control signal on the selected output terminal in response to the activated off-hook detected signal and the configuration information, and (5) cutting the ring current in response to the activated ring cut control signal. The CODEC includes a control register for storing the configuration information, and a hardware cut ring current (HCRC) circuit, which activates the ring cut control signal on the selected output terminal in response to the activated off-hook detected signal and the configuration information.

16 Claims, 2 Drawing Sheets

PROGRAMMABLE DEVICE AND METHODS FOR DISABLING A RING SIGNAL IN RESPONSE TO A DETECTED OFF-HOOK CONDITION

BACKGROUND OF THE INVENTION

1. Field of the Invention

This invention relates to a programmable device that disables a ring signal sent by a subscriber line interface circuit (SLIC) of a programmable switch in a telecommunications system when a subscriber telephone is placed in an off-hook condition. The present invention also relates to methods for disabling such a ring signal.

2. Related Art

During a telephone call, it is very important to quickly cut (disable) the ring current after a subscriber answers an incoming call (i.e., places the telephone in an off-hook condition). If the ring current is not quickly disabled, then the high voltage ring current will flow through the subscriber's line and damage the subscriber's telephone unit.

The traditional methods of disabling the ring current when a subscriber places the telephone in an off-hook condition include hardware and software approaches. As described below, these methods are complicated, inflexible, and/or too slow to properly cut the ring signal current to the subscriber's telephone.

FIG. 1 is a block diagram of a conventional programmable switch 100 that uses a hardware approach for disabling the ring current when a subscriber (i.e., user) answers a telephone call. Programmable switch 100 includes a subscriber line interface circuit (SLIC) 101, hardware cut ring current (HCRC) device 102, ring relay 103, ring generating circuit 104, coder/decoder (CODEC) 105 and central processing unit (CPU) 106. CODEC 105 and CPU 106 are shown in dashed lines because these blocks are not used to cut the ring current in the hardware approach of FIG. 1.

SLIC 101, which is located at the subscriber line interface of programmable switch 100, is connected to the subscriber's telephone unit 111 by a telephone line 110. When a call is placed to the subscriber, ring generating circuit 104 generates a ring signal RING, which is a high voltage AC signal (e.g., 70–90 Volt AC). Ring relay 103 is closed, thereby routing the RING signal to SLIC 101 as the RING_OUT signal. SLIC 101 then routes the RING_OUT signal to the subscriber's telephone unit 111 on telephone line 110, thereby causing this telephone unit to ring. The RING_OUT signal results in a high ring current on telephone line 110. When the subscriber answers the call, telephone unit 111 is placed in an off-hook condition. SLIC 101 detects the off-hook condition on telephone line 110, and in response, activates an off-hook detected signal (DET) at an output terminal of SLIC 101.

The activated DET signal is transmitted from the output terminal of SLIC 101 to HCRC device 102. HCRC device 102 uses detailed hardware circuit signal processing in order to activate a ring cut signal (RING_CUT) in response to the activated DET signal. The activated RING_CUT signal is applied to ring relay 103, thereby causing ring relay 103 to switch to an open state. When in the open state, ring relay 103 disconnects the signal path between ring generating circuit 104 and SLIC 101. As a result, the RING signal is no longer routed through ring relay 103 as the RING_OUT signal and the ring current is unable to reach SLIC 101 or the subscriber's telephone. Cutting off the ring current in this manner protects the subscriber's telephone from damage.

The advantage of the hardware cut ring method is the fast speed of the ring cut process. However, HCRC device 102 requires a complicated control circuit, which is assembled using discrete devices. Moreover, after HCRC device 102 of FIG. 1 has been designed, the high and low voltage levels of the input and output signals (DET and RING_CUT) are fixed, and are therefore not programmable.

FIG. 2 is a block diagram of a conventional programmable switch 200 that uses a software approach for cutting the ring current when a subscriber answers a telephone call. Programmable switch 200 includes a subscriber line interface circuit (SLIC) 201, ring relay 203, ring generating circuit 204, coder/decoder (CODEC) 205 and central processing unit (CPU) 206. Programmable switch 200 utilizes CPU 206 for software control, in lieu of using hardware cut ring current device 102 of FIG. 1.

SLIC 201, ring relay 203 and ring generating circuit 204 operate in a manner similar to SLIC 101, ring relay 103 and ring generating circuit 104 of programmable switch 100 (FIG. 1). Thus, when a call is placed to the subscriber, ring generating circuit 204 generates the RING signal, which is routed through ring relay 203 and SLIC 201 to the subscriber's telephone unit 211 on telephone line 210, thereby causing this telephone unit to ring. When the subscriber answers the call, the telephone is placed in an off-hook condition. SLIC 201 detects the off-hook condition on telephone line 210, and in response, activates an off-hook detected signal (DET) at an output terminal of SLIC 201.

The activated DET signal is transmitted from the output terminal of SLIC 201 to CPU 206. CPU 206 processes the DET signal with programmed software. When the software determines that the DET signal has been properly activated, CPU activates a ring cut signal (RING_CUT) in response to the activated DET signal. The activated RING_CUT signal is applied to ring relay 203, thereby causing ring relay 203 to switch to an open state. When in the open state, ring relay 203 disconnects the signal path between ring generating circuit 204 and SLIC 201. As a result, the ring current is cut off from SLIC 201 and the subscriber's telephone unit 211. Again, cutting off the ring current in this manner protects the subscriber's telephone from damage.

The advantages of the software cut ring method implemented by programmable switch 200 include the simplicity of the circuit, the flexibility of the circuit, and the capability of re-programming the circuit. One disadvantage of the software cut ring method is that CPU 206 requires a relatively long processing time before activating the RING_CUT signal. This relatively long processing time can result in a significant delay in cutting off the ring current, thereby resulting in damage to subscriber's telephone unit 211. Another disadvantage of the software cut ring method is that CPU 206 may fail to activate the RING_CUT signal during a software testing period or during a period in which CPU 206 is malfunctioning. In these cases, CPU 206 will fail to cut off the ring current, thereby resulting in damage to the subscriber's telephone unit 211.

It would therefore be desirable to have a method and apparatus for cutting off ring current, which overcomes the above-described deficiencies of the hardware and software cut ring current methods. That is, it would be desirable to have a method and apparatus for cutting off ring current that is capable of quickly cutting off the ring current upon detecting an off-hook condition, while having the advantage of being programmable.

SUMMARY

Accordingly, the present invention provides a programmable safe cut ring system that includes a subscriber line interface circuit (SLIC) coupled to a telephone unit, the SLIC being configured to activate an off-hook detected signal upon detecting that the telephone unit is in an off-hook condition. A ring generating circuit provides a high voltage ring signal to a ring relay. The ring relay controls the routing of the ring signal to the SLIC. When a ring cut control signal applied to a control terminal of the ring relay is activated, the ring relay disconnects the ring generating circuit from the SLIC. The programmable safe cut ring system also includes a central processing unit (CPU) and a coder/decoder (CODEC).

In accordance with one embodiment of the present invention, the CODEC includes a set of input terminals, wherein one of the input terminals is selectively coupled to receive the off-hook detected signal. Any one of the input terminals can be configured to receive the off-hook detected signal. The CODEC also includes a set of output terminals, wherein one of the output terminals is selectively coupled to the control terminal of the ring relay. Any one of the output terminals can be coupled to the control terminal of the ring relay.

The CODEC also includes a control register, which stores a configuration value, which is programmably selected by the CPU. This configuration value defines a correspondence between one of the input terminals and one of the output terminals. More specifically, this configuration value is selected to define a correspondence between with the input terminal coupled to receive the off-hook detected signal, and the output terminal coupled to the control terminal of the ring relay.

The CODEC also includes a hardware cut ring current (HCRC) circuit coupled to the set of input terminals, the set of output terminals, and the control register. In response to the configuration value, the HCRC circuit immediately activates a ring cut signal on the output terminal coupled to the control terminal of the ring relay upon detecting the off-hook detected signal on the input terminal coupled to receive the off-hook detected signal.

The CODEC of the present invention advantageously enables the ring cut signal to be activated quickly upon receiving an off-hook detected signal. In addition, this CODEC provides flexibility in configuring the system.

In accordance with another embodiment of the present invention, the CODEC can also include an input register and an output register, each coupled to the HCRC circuit and the CPU. The input register and the output register are each initially programmed to store an on-hook state value provided by the CPU. Upon receiving the activated off-hook detected signal, the HCRC circuit overwrites the on-hook state value stored in the output register with an off-hook state value. When the off-hook detected signal is de-activated, the HCRC circuit overwrites the off-hook state value stored in the output register with the on-hook state value. The CPU monitors the time that an off-hook state value remains stored in the output register. If the off-hook state value remains in the output register for a predetermined time period, then the CPU writes an off-hook state value to the input register of the CODEC. The off-hook state value stored in the input register of the CODEC provides confirmation to the HCRC circuit that the ring cut signal was properly activated.

If the off-hook state value does not remain in the output register for the predetermined time period, then the CPU will not write an off-hook state value to the input register of the CODEC. This may occur if the off-hook detected signal exhibits a spike, and quickly transitions from a de-activated state to an activated state, and then back to a de-activated state. Upon detecting that the off-hook detected signal is de-activated and the input register does not store an off-hook state value, the HCRC circuit will de-activate the ring cut signal. This advantageously prevents the CODEC from erroneously continuing to activate the ring cut control signal when there are short spikes in the off-hook detected signal.

The present invention also includes a method of cutting the ring current when a subscriber's telephone unit is placed in an off-hook state. The method includes: (1) activating an off-hook detected signal in response to the telephone unit entering the off-hook state, (2) applying the off-hook detected signal to a selected input terminal of a coder/decoder (CODEC), (3) storing configuration information in the CODEC identifying the selected input terminal of the CODEC and a selected output terminal of the CODEC, (4) activating a ring cut control signal on the selected output terminal of the CODEC in response to the activated off-hook detected signal and the configuration information, and (5) cutting the ring current in response to the activated ring cut control signal.

This method can also include the steps of determining whether the activated off-hook detected signal remains activated for a predetermined time period, and only continuing to activate the ring cut control signal if the activated off-hook detected signal remains activated for the predetermined time period.

The present invention will be more fully understood in view of the following description and drawings.

DETAILED DESCRIPTION

Figure 1:
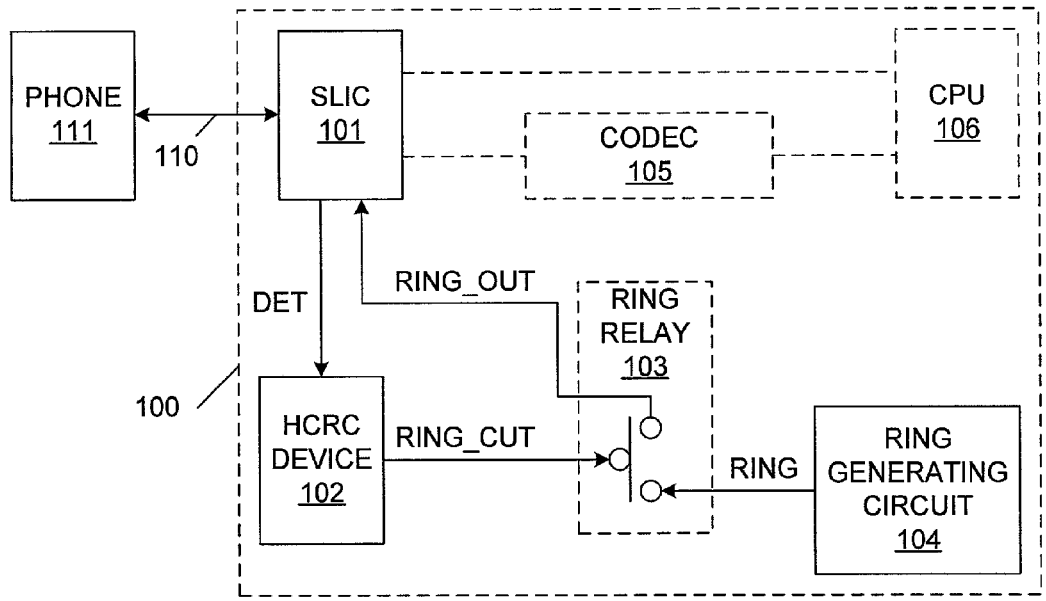
FIG. 1 is a block diagram of a conventional programmable switch that uses a hardware approach for cutting a ring current.
Figure 2:
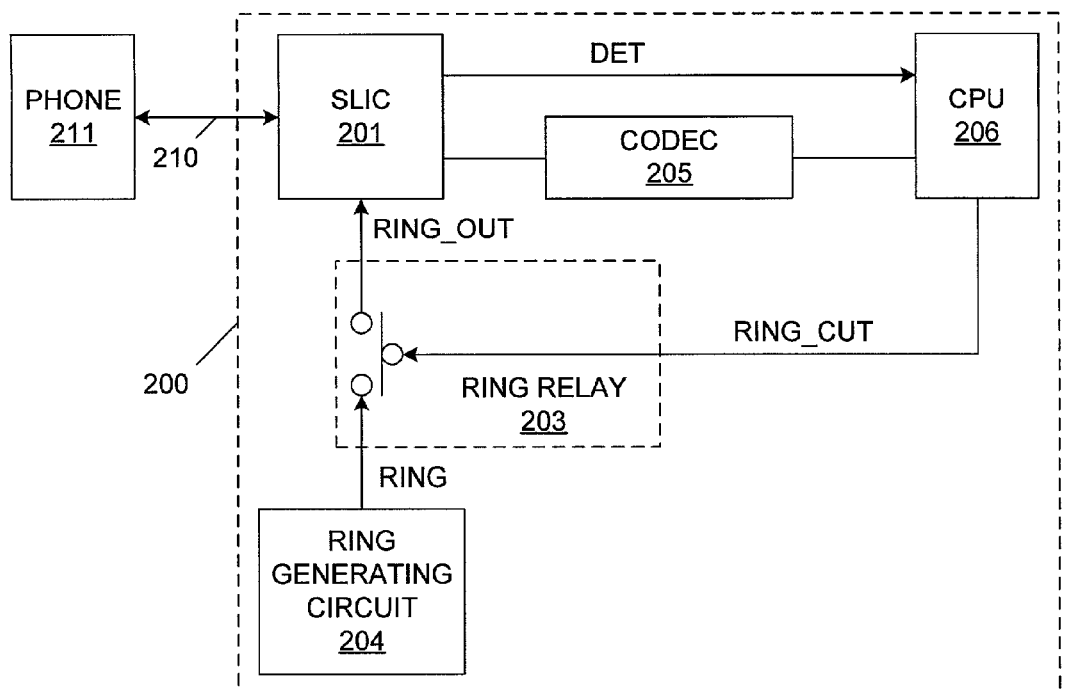
FIG. 2 is a block diagram of a conventional programmable switch that uses a software approach for cutting a ring current.
Figure 3:
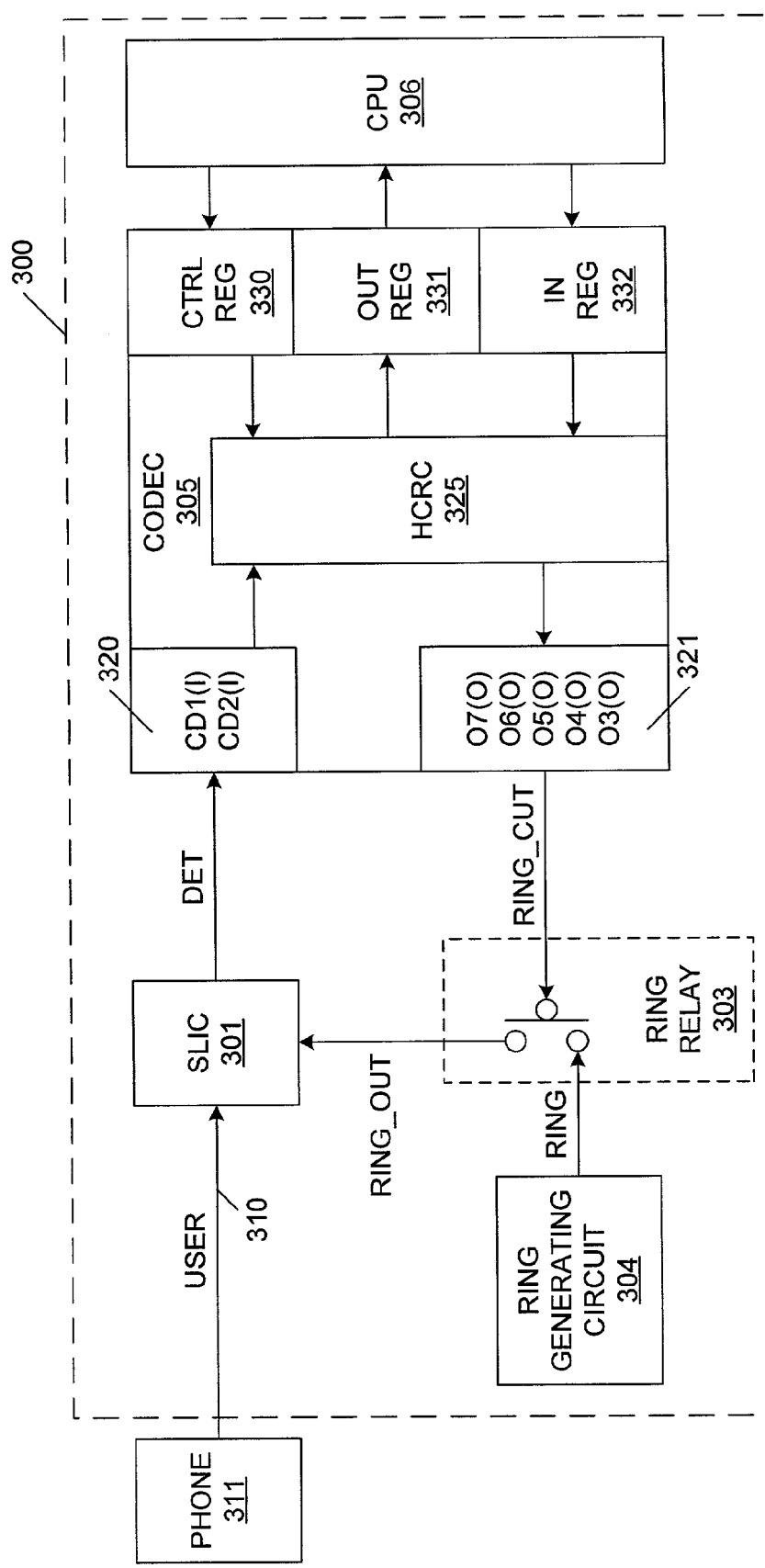
FIG. 3 is a block diagram of a programmable switch that uses a combined software/hardware approach for cutting a ring current in accordance with one embodiment of the present invention.

FIG. 3 is a block diagram of a programmable switch 300 that uses a combined software/hardware approach for cutting off ring current in accordance with one embodiment of the present invention. Programmable switch 300 includes subscriber line interface circuit (SLIC) 301, ring relay 303, ring generator circuit 304, coder/decoder (CODEC) 305 and central processing unit (CPU) 306. CODEC 305 includes input terminals 320, output terminals 321, hardware cut ring current (HCRC) device 325, control register 330, output register 331 and input register 332. In general, CODEC 305 performs the traditional functions of voice signal coding and decoding, as well as the functions of the present invention, which are described below. CPU 306 controls the general operation of programmable switch 300.

CODEC 305 includes multiple cut ring input terminals CD1(I) and CD2(I), which are collectively labeled as cut ring input terminals 320 in FIG. 3. Although only two cut ring input terminals are described in the present example, it is understood that other numbers of cut ring input terminals can be implemented in other embodiments. One of the cut ring input terminals CD1(I) and CD2(I) is connected to receive an off-hook signal detected signal DET from SLIC 301. SLIC 301 activates the off-hook signal detected signal DET upon detecting that the subscriber's telephone unit 311 (connected to telephone line 310) is in an off-hook condition.

CODEC 305 also includes multiple cut ring output terminals O3(O), O4(O), O5(O), O6(O), and O7(O), which are collectively labeled as cut ring output terminals 321 in FIG. 3. Although five cut ring output terminals are described in the present example, it is understood that other numbers of cut ring input terminals can be implemented in other embodiments. In the described embodiment, one of the multiple cut ring output terminals O3(O), O4(O), O5(O), O6(O) or O7(O) is connected to the control terminal of ring relay 303, as illustrated. Note that the other ring output terminals can be connected to control other relays (not shown). As described in more detail below, CODEC 305 provides a ring cut control signal (RING_CUT) on the selected cut ring output terminal to control the on/off state of ring relay 303.

Control register 330 of CODEC 305 is programmed to save configuration information (e.g., a configuration value) the defines a correlation between the selected one of the cut ring input terminals CD1(I) or CD2(I) and the selected one of the cut ring output terminals O3(O), O4(O), O5(O), O6(O) or O7(O). For example, if cut ring input terminal CD1(I) is coupled to receive the off-hook detected signal DET, and cut ring output terminal O5(O) is coupled to the control terminal of ring relay 303, then a configuration value stored in control register 330 is selected to indicate that cut ring input terminal CD1(I) is coupled to receive the off-hook detected signal, and the cut ring output terminal O5(O) is coupled to the control terminal of ring relay 303. This configuration value instructs HCRC circuit 325 to immediately activate the ring cut control signal RING_CUT on output terminal O5(O) when HCRC circuit 325 detects that the off-hook detected signal DET has been activated on the selected input terminal CD1(I).

Note that HCRC circuit 325 included in CODEC 305, and therefore does not require additional expensive hardware, such as discrete devices.

To summarize, the activated off-hook detected signal DET is provided from the selected one of the cut ring input terminals CD1(I) or CD2(I) to HCRC circuit 325. In response, HCRC circuit 325 immediately changes an output voltage that is provided to the selected one of the multiple cut ring output terminals O3(O), O4(O), O5(O), O6(O) or O7(O). HCRC circuit 325 chooses this cut ring output terminal in response to the configuration information saved in control register 330. The configuration information saved in control register 330 is programmed by central processing unit CPU 306. The configuration information stored by control register 330 can also define the voltage level of the RING_CUT output signal provided by hardware cut ring current circuit 325. In this manner, programmable switch 300 provides the capability to flexibly program the voltage level of the RING_CUT signal and select the cut ring output terminal.

As illustrated in FIG. 3, CODEC 305 can optionally include output register 331 and input register 332. These registers 331 and 332 are each connected to HCRC circuit 325 and central processing unit 306. Central processing unit 306 initializes output register 331 and input register 332, such that each of these registers initially stores an on-hook state value that indicates the subscriber's telephone unit 311 is in an on-hook state. Output register 331 and input register 332 maintain these on-hook state values as long as the subscriber's telephone unit 311 remains in an on-hook state.

At some point, the selected cut ring input terminal CD1(I) or CD2(I) receives a de-activated off-hook detected signal DET from SLIC 301 (via the subscriber's telephone unit 311 and telephone line 310). When the selected cut ring input terminal CD1(I) or CD2(I) receives an activated off-hook detected signal DET from SLIC 301, HCRC circuit 325 overwrites the on-hook state value stored in output register 331 with an off-hook state value, thereby indicating that an activated off-hook detected signal DET has been detected.

CPU 306 continuously monitors the state value stored by output register 331. If CPU 306 detects that that output register 331 continuously stores an off-hook state value for a predetermined time period, then CPU 306 overwrites the on-hook state value stored in input register 332 with an off-hook state value, thereby indicating that the off-hook condition has existed on telephone line 310 for the predetermined time period. The off-hook state value stored in input register 332 provides confirmation to HCRC circuit 325, thereby indicating that HCRC circuit 325 properly activated the RING_CUT control signal at the selected cut ring output terminal O3(O), O4(O), O5(O), O6(O) or O7(O).

However, if CPU 306 does not detect that output register 331 continuously stores an off-hook state value for a predetermined time period, then CPU 306 does not overwrite the on-hook state value stored in input register 332. This may occur, for example, if the off-hook detected signal DET exhibits a short spike (having a duration less than the predetermined time period) while the RING current is being applied to the subscriber's telephone unit 311 on telephone line 310. When such a spike begins, HCRC circuit 325 writes an off-hook state value to output register 331. When the spike ends, HCRC circuit 325 writes an on-hook state value to output register 331. Under these conditions, CPU 306 does not detect that the off-hook state value was continuously stored in output register 331 for the predetermined period. As a result, CPU 306 does not write an off-hook state value to input register 332 (thereby maintaining an on-hook state value in input register 332). HCRC circuit 325 detects that input register 332 continues to provide an on-hook state value when the off-hook detected signal DET is de-activated at the end of the spike. In response, HCRC circuit 325 de-activates the RING_CUT signal (which was activated immediately upon detecting the activated off-hook detected signal DET), thereby causing ring relay 303 to close and provide the RING signal as the RING_OUT signal. In this manner, the false off-hook state introduced by the spike in the off-hook detected signal DET does not cause the ring current to be erroneously cut off.

In the present invention, the above-described HCRC circuit 325, control register 330, output register 331, input register 332 and CODEC 305 can all be integrated on a single chip. This promotes the integration of the elements of programmable switch 300 and improves the programmable capability of programmable switch 300.

Although the invention has been described in connection with several embodiments, it is understood that this invention is not limited to the embodiments disclosed, but is capable of various modifications, which would be apparent to a person skilled in the art. Thus, the invention is limited only by the following claims.

I claim:

1. A programmable safe cut ring system, comprising:
   a subscriber line interface circuit (SLIC) coupled to a telephone unit, the SLIC being configured to activate an off-hook detected signal upon detecting that the telephone unit is in an off-hook condition;

a ring relay for routing a ring signal to the SLIC, the ring relay having a control terminal used to control the state of the ring relay;

a central processing unit (CPU); and a coder/decoder (CODEC) that includes:

a set of input terminals, wherein a selected one of the input terminals is coupled to receive the off-hook detected signal;

a set of output terminals, wherein a selected one of the output terminals is coupled to the control terminal of the ring relay;

a control register configured to store configuration information provided by the CPU; and a hardware cut ring current (HCRC) circuit coupled to the set of input terminals, the set of output terminals, and the control register, wherein the HCRC circuit is configured to activate a ring cut signal on the selected one of the output terminals upon detecting the off-hook detect signal on the selected one of the input terminals in response to the configuration information stored by the control register.

2. The system of claim 1, wherein the CODEC further includes circuitry used to code and decode the processing of voice signals.

3. The system of claim 1, further comprising a ring generating circuit connected to the ring relay, the ring generating circuit being configured to generate a ring signal, which is routed through the ring relay to the SLIC when the ring relay is in a closed state.

4. The system of claim 1, wherein the CODEC further comprises an output register coupled to the HCRC circuit and the CPU, the output register being configured to store state values provided by the HCRC circuit in response to the off-hook detected signal.

5. The system of claim 4, wherein the CODEC further comprises an input register coupled to the HCRC circuit and the CPU, the input register being configured to store state values provided by the CPU in response to the state values stored in the output register.

6. A method of cutting a ring current when a telephone unit enters an off-hook state, the method comprising:

activating an off-hook detected signal in response to the telephone unit entering the off-hook state;

applying the off-hook detected signal to a selected input terminal of a coder/decoder (CODEC);

storing configuration information in the CODEC identifying the selected input terminal of the CODEC and a selected output terminal of the CODEC;

activating a ring cut control signal on the selected output terminal of the CODEC in response to the activated off-hook detected signal and the configuration information;

determining whether the activated off-hook detected signal remains activated for a predetermined time period;

continuing to activate the ring cut control signal if the activated off-hook detected signal remains activated for the predetermined time period; and cutting the ring current in response to the activated ring cut control signal.

7. The method of claim 6, further comprising programming a control register of the CODEC to store the configuration information.

8. The method of claim 6, further comprising selecting the selected input terminal from a plurality of input terminals.

9. The method of claim 6, further comprising selecting the selected output terminal from a plurality of output terminals.

10. The method of claim 6, further comprising de-activating the ring cut control signal if the activated off-hook detected signal does not remain activated for the predetermined time period.

11. The method of claim 6, further comprising selecting a voltage of the ring cut control signal in response to the configuration information.

12. A programmable safe cut ring system, comprising:

means for activating an off-hook detected signal in response to a telephone unit entering the off-hook state;

means for applying the off-hook detected signal to a selected input terminal of a coder/decoder (CODEC);

means for storing configuration information in the CODEC identifying the selected input terminal of the CODEC and a selected output terminal of the CODEC;

means for activating a ring cut control signal on the selected output terminal of the CODEC in response to the activated off-hook detected signal and the configuration information;

means for determining whether the activated off-hook detected signal remains activated for a predetermined time period;

means for continuing to activate the ring cut control signal if the activated off-hook detected signal remains activated for the predetermined time period; and means for cutting the ring current in response to the activated ring cut control signal.

13. The system of claim 12, further comprising means for programming a control register of the CODEC to store the configuration information.

14. The system of claim 12, further comprising means for coupling the selected input terminal to the selected output terminal.

15. The system of claim 12, further comprising means for de-activating the ring cut control signal if the activated off-hook detected signal does not remain activated for the predetermined time period.

16. The method of claim 12, further comprising means for selecting a voltage of the ring cut control signal in response to the configuration information.

* * * * *